US006344864B1

(12) United States Patent
Watanabe

(10) Patent No.: US 6,344,864 B1
(45) Date of Patent: *Feb. 5, 2002

(54) INFORMATION PROCESSING APPARATUS AND METHOD, WHICH PERFORMS PROCESSING ON A TRANSFER-SOURCE WINDOW WHEN A FILE IS MOVED OR COPIED

(75) Inventor: Yoshihiko Watanabe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,042

(22) Filed: Jul. 20, 1998

(30) Foreign Application Priority Data

Jul. 29, 1997 (JP) .............................................. 9-203217

(51) Int. Cl.7 ................................................. G06F 3/14
(52) U.S. Cl. ....................... 345/788; 345/804; 345/769; 345/803
(58) Field of Search ................................. 345/342, 340, 345/346, 339, 348, 356, 145, 343, 344, 345, 788, 790, 794, 796, 797, 800, 803, 804, 769, 853, 835, 856, 859–860, 781; 709/303, 315, 329, 313

(56) References Cited

U.S. PATENT DOCUMENTS

| 5,583,984 A | * 12/1996 | Conrad et al. .............. 345/340 |
| 5,590,265 A | * 12/1996 | Nakazawa ................... 345/340 |
| 5,699,535 A | * 12/1997 | Amro ......................... 345/342 |
| 5,704,050 A | * 12/1997 | Redpath ..................... 345/339 |
| 5,874,958 A | *  2/1999 | Ludolph ..................... 345/339 |
| 5,990,889 A | * 11/1999 | Amro ......................... 345/342 |

* cited by examiner

Primary Examiner—Raymond J. Bayerl
(74) Attorney, Agent, or Firm—Fitzpatrick, Cella, Harper & Scinto

(57) ABSTRACT

A plurality of windows are displayed on a display screen, and a file within one of the plurality of windows is specified by an input section. The one window having the specified file is displayed on the display screen in such a way that the size of the one window is reduced. When a window of a transfer destination is specified by the input section, the window of a transfer source is displayed as a window having the original size.

29 Claims, 5 Drawing Sheets

INFORMATION PROCESSING APPARATUS AND METHOD, WHICH PERFORMS PROCESSING ON A TRANSFER-SOURCE WINDOW WHEN A FILE IS MOVED OR COPIED

BACKGROUND OF THE INVENTION

1. Field of the Invention

The present invention relates to an information processing apparatus and method and, more particularly, to an information processing apparatus and method having a function of displaying a plurality of windows on a display screen.

2. Description of the Related Art

In a conventional windows system, for example, in Windows 95 of U.S. Microsoft Corp., the use of the "drag-and-drop" function instead of a "menu command" makes it possible to easily copy, move, or print an item, such as a file. That is, while pressing a mouse button, an item can be dragged to another location. Presently, an item can be moved by only dragging the item by the left button of the mouse, and copied by dragging it by the left button of the mouse and by pressing the Shift key.

As an actual operation, the copying of a specific file between folders is described below.

The name of a file to be copied is denoted as a file 1, the name of a folder from which the file is copied is denoted as a transfer-source folder, and the name of a folder to which the file is copied is denoted as a transfer-destination folder.

Initially, the transfer-source folder is opened by double-clicking it with a mouse, and adjustments are made by the horizontal and vertical scroll bars of the transfer-source folder so that an object file 1 can be seen. Then, the position of the transfer-source folder or the transfer-destination folder is determined so that the transfer-destination folder can be seen. Finally, while pressing the Shift key, copying is performed by dragging the file 1 with the left button of the mouse and moving it onto the transfer-destination folder and dropping it therein.

However, in the above-described conventional art, to find an object file, generally, there is a demand to find it in such a way that the window of a transfer-source folder is made as large as possible. Since the transfer-destination folder is concealed, if the transfer-source folder is too large, there is a need for the window size to be limited to an extent that the folder is not concealed; a larger size is taken until the object file is found and after it is found the window size is reduced by adjusting the scroll bar to an extent that the found file is not concealed; or it is required that the transfer-source folder be moved to a position at which the transfer-destination folder is not concealed and the object file is then dragged.

Therefore, there are drawbacks, such as the window size of the transfer source folder requiring adjustment or the positioning of the transfer-source folder and the transfer-destination folder requiring adjustment. Further, when this copy operation is repeated a plurality of times, there are drawbacks, such as the window size of the transfer-source folder requiring adjustment at each time or the position of the transfer-source folder needing to be moved.

SUMMARY OF THE INVENTION

Accordingly, it is an object of the present invention to provide an information processing apparatus and method, which performs processing on a transfer-source window when a file or the like is moved or copied, thereby improving the ease of operation.

To achieve the above-described object, according to one aspect of the present invention, there is provided an information processing apparatus having a function for displaying a plurality of windows on a display screen, the information processing apparatus including transfer-source specification means for specifying a file of a transfer source; transfer-destination specification means for specifying a file of a transfer destination; and processing means for, when the file of the transfer source is specified, performing size processing on a window of the transfer source having a file of the transfer source.

According to another aspect of the present invention, there is provided an information processing method including the steps of, displaying a plurality of windows on a display screen; specifying a file of a transfer source; reducing the size of the window of the transfer source having the specified file; and specifying a transfer destination.

The above and further objects, aspects and novel features of the invention will become more apparent from the following detailed description when read in connection with the accompanying drawings.

DETAILED DESCRIPTION OF THE PREFERRED EMBODIMENT

The preferred embodiment of the present invention is described below in detail with reference to the accompanying drawings.

Figure 1:
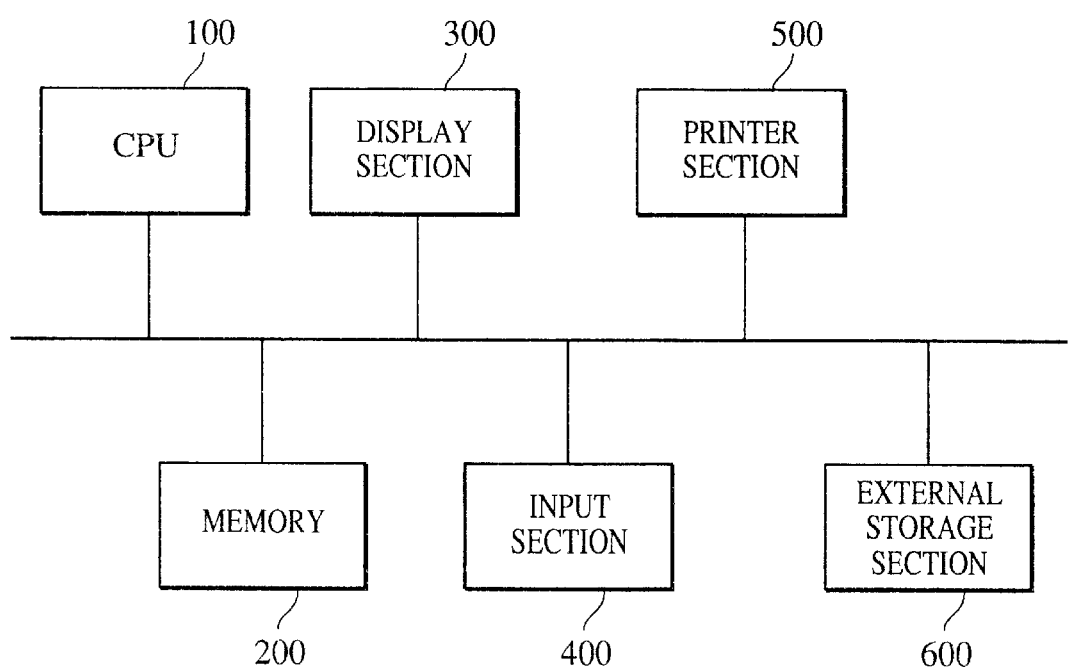
FIG. 1 is a block diagram of a computer apparatus of the present invention.

FIG. 1 is a block diagram of a computer apparatus of the present invention.

Shown in FIG. 1 are a CPU 100 which controls the entire apparatus in accordance with a processing procedure to be described later, a memory 200 which stores the processing procedure, various file information, and the like, read from an external storage apparatus 600 in order to realize the present invention, and which is also used as a work area for the CPU 100, a display section 300 on which various information is displayed, an input section 400 which is formed of a keyboard, a mouse, or the like, a printer section 500 which prints and outputs various information, and the external storage section 600 in which processing procedures, file information, and the like for realizing the present invention are stored.

Figure 2:
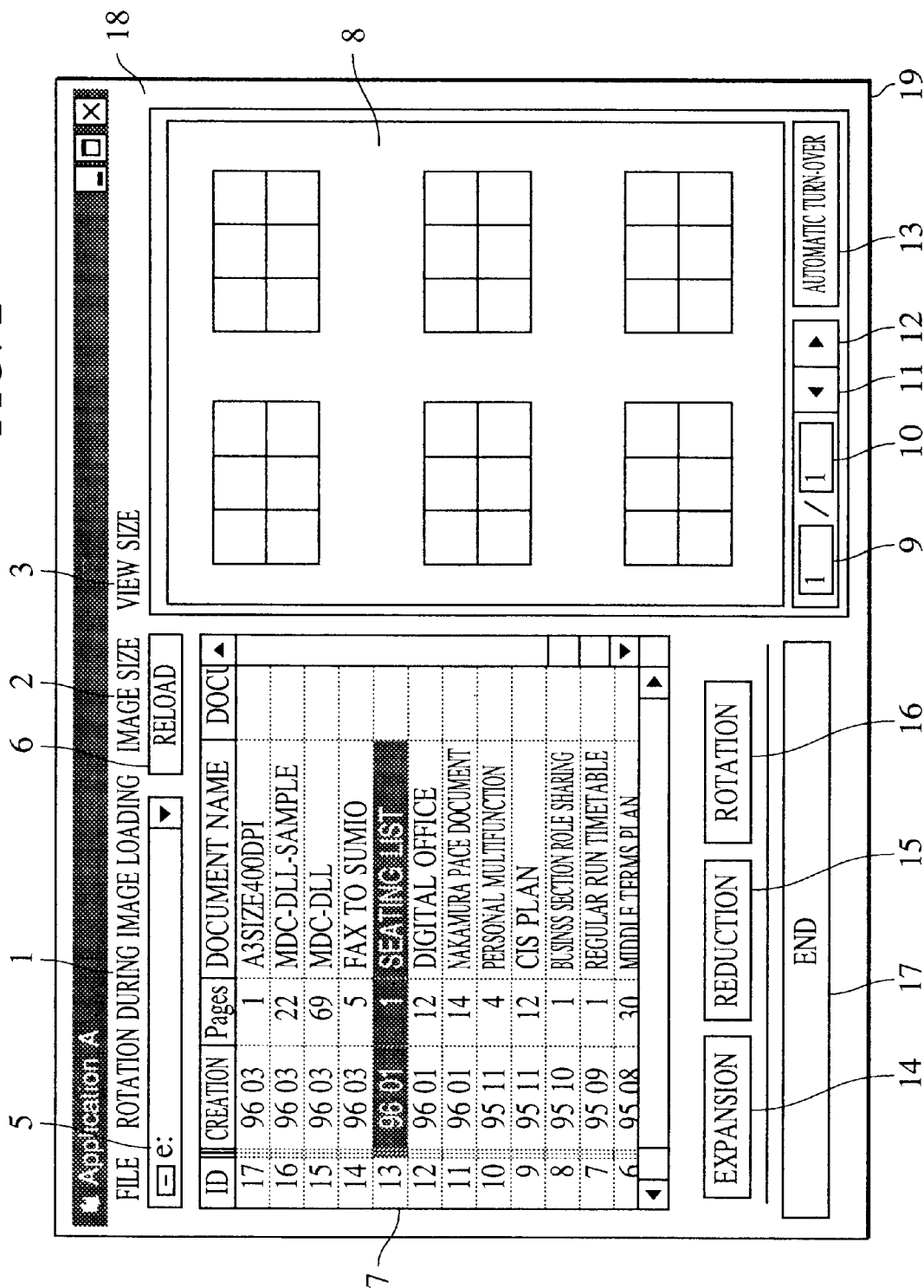
FIG. 2 is an example of a window displayed on a display screen of a display section 300 of FIG. 1 in this embodiment of the present invention.

FIG. 2 shows an example of a window (hereinafter referred to as an application form) displayed on a display screen of the display section 300 in this embodiment.

A document list box 7 which mostly occupies the left half of an application form 18 displays as a quick reference a list of documents such that an application assigned to the application form 18 can be displayed. By clicking a mouse, each line by a mouse cursor (not shown), the document of that line is selected, and the first page of that document is automatically displayed in an image display section 8.

In this embodiment, one page or a plurality of pages form a group of units, and this is called a document.

A document unit is defined so that indices, such as the document name, document number, or, creation date, are created and displayed in the document list box 7.

The total number of pages of the selected document is displayed in a textbox section 10, and the page displayed in the image display section 8 is displayed in a textbox section 9. When a second or later page of the selected document is to be displayed, the display can be made by clicking a page forward button 12. Conversely, the turned-over pages can be turned back by a page back button 11. An automatic forward button 13 is used to automatically turn over the entire document and all pages. When the page forward button 12 and the page back button 11 are continuously pressed for more than predetermined time, page turn-over is automatically performed, and this stops at the beginning and end of the document, accompanied by a beep sound.

An expansion button 14, a reduction button 15, and a rotation button 16 are used to expand, reduce, and rotate, respectively, an image displayed on the image display section 8.

A rotation during image loading item 1 in the menu bar is used to select a rotation angle for making an image display after the selected image file is rotated by 0, +90, 180, or –90 degrees. The selected information value of this rotation angle selection menu is stored in a predetermined folder in the name of MdcDdefoData at the time of selection, and this file is read at the next start-up of this application so that the value for the rotation during loading of an image is maintained.

An image size item 2 in the menu bar is used to select the size so that the selected image file is displayed in a size of 1/1 to 1/8 on the image display section 8. In the case of 1/1, the display is made so that one dot of an image corresponds to one dot of a display.

Also at this size selection, the selected information value is stored in the file name of MdcDdefoData, and this value is read at the next start-up so that the state is maintained.

A view size item 3 in the menu bar is used to set the size of the image display section 8 at the most appropriate size of 1/1 to 1/8 of the image size. The selected information is also stored in the file name of MdcDdefoData, and this is read at the next start-up so that the state is maintained.

A drive list box 5 is used to select a drive in which there is image data. The selected information is also stored in the file name of MdcDdefoData, and this is read at the next start-up so that the state is maintained.

A reload button 6 is a button that selects a drive in which there is an image data corresponding to an optomagnetic disk drive or a removable medium drive, such as a CD-ROM, and is a button for reloading data in order to update the information of the document list box 7 when a medium is replaced.

Next, a description is given of the function of file copy by drag-and-drop.

Figure 3A:
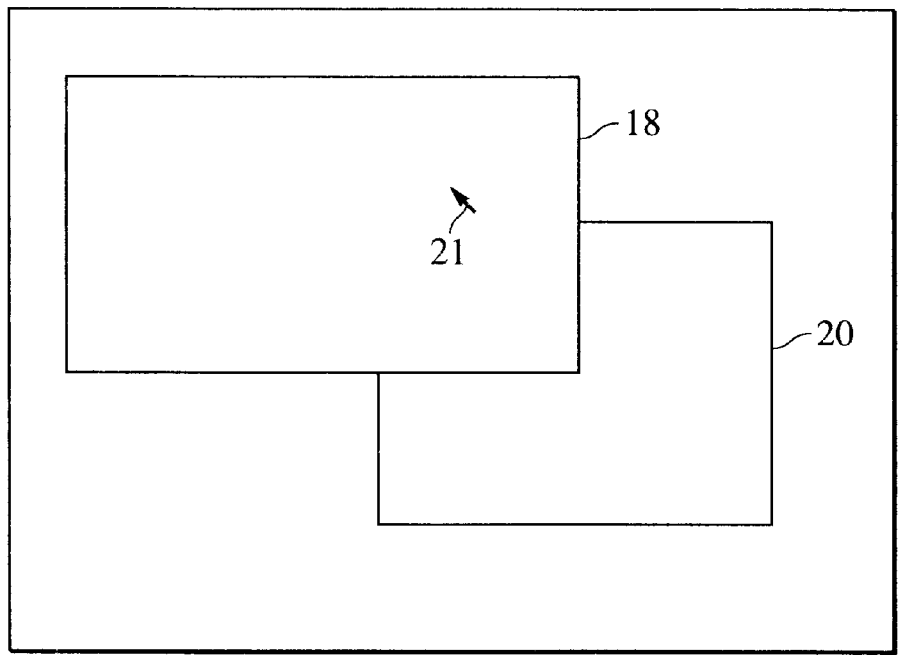
FIGS. 3A and 3B show changes in the display of the display screen in this embodiment of the present invention.
Figure 3A:
Figure 3B:
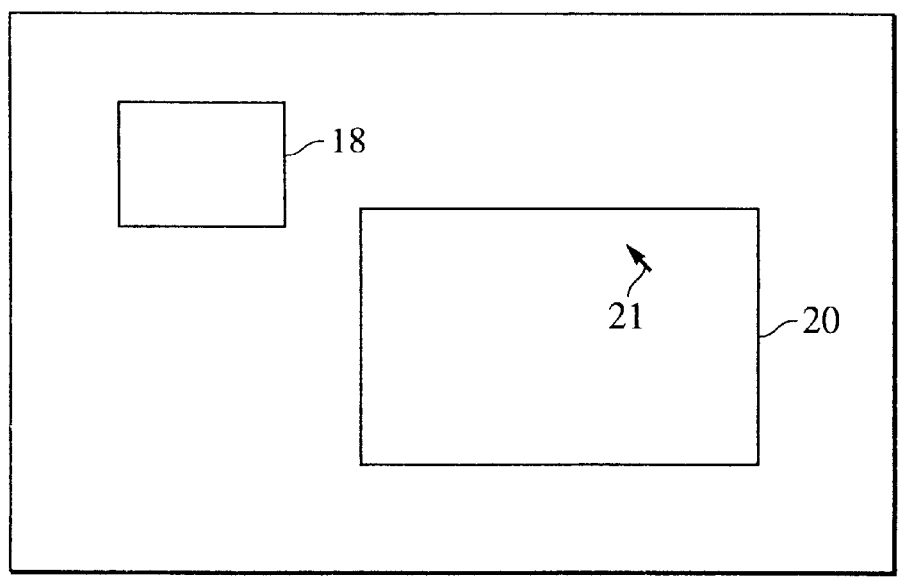

By moving a mouse cursor 21, the image display section 8 is dragged, the mouse cursor 21 is moved to an arbitrary folder (for example, a window 20 in FIGS. 3A and 3B) and dropped, and thus the file displayed in the image display section 8 can be copied into the folder.

Figure 4:
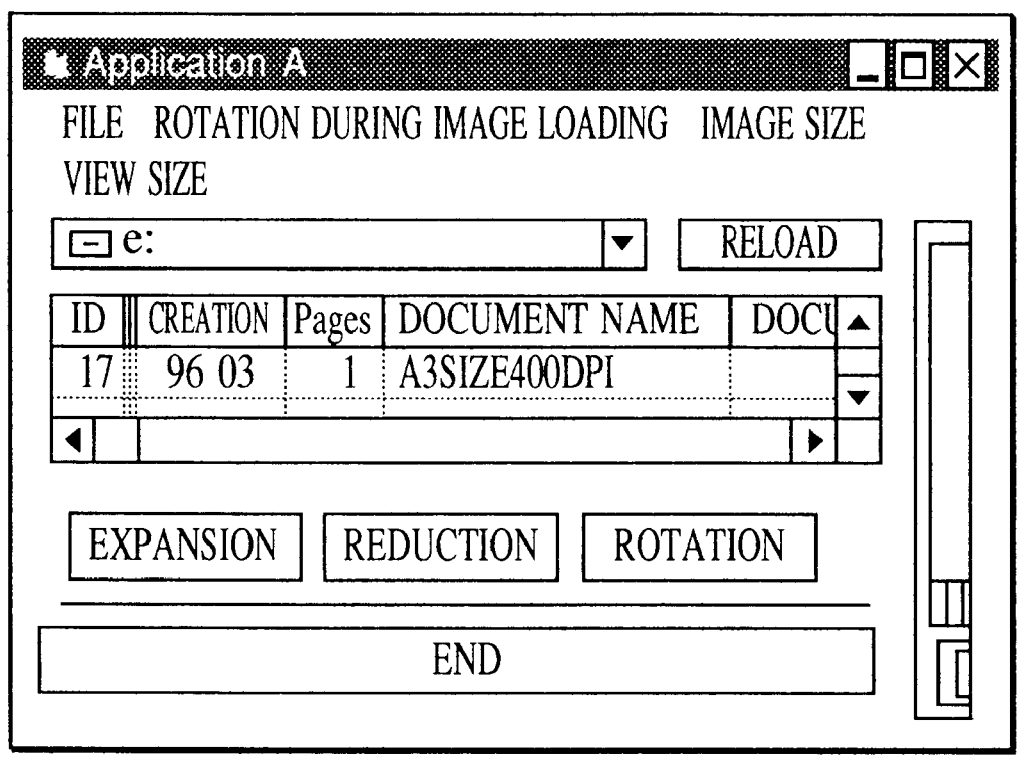
FIG. 4 is an example of the window shown in FIG. 2 being reduced in size.

At this point, by clicking the right button of the mouse in the image display section 8 in advance before dragging, it is possible to reduce the size of the application form 18, as shown in FIG. 4, during the drag-and-drop. As a measure, in a case in which the right button of the mouse is clicked, but there has been a change of mind before dragging and it is not desired that the size of the application form 18 be changed, return is possible by clicking the right button of the mouse once more in such a way that the size of the application form 18 is not changed. That is, the clicking of the right button of the mouse is a toggle switch for reducing or not reducing the size of the application form 18 during dragging. For this reason, in order that it becomes easy to see the state, the color of the background of the application form 18 is changed to a brilliant color when the size is to be reduced. The foregoing is file copy by drag-and-drop.

Figure 5:
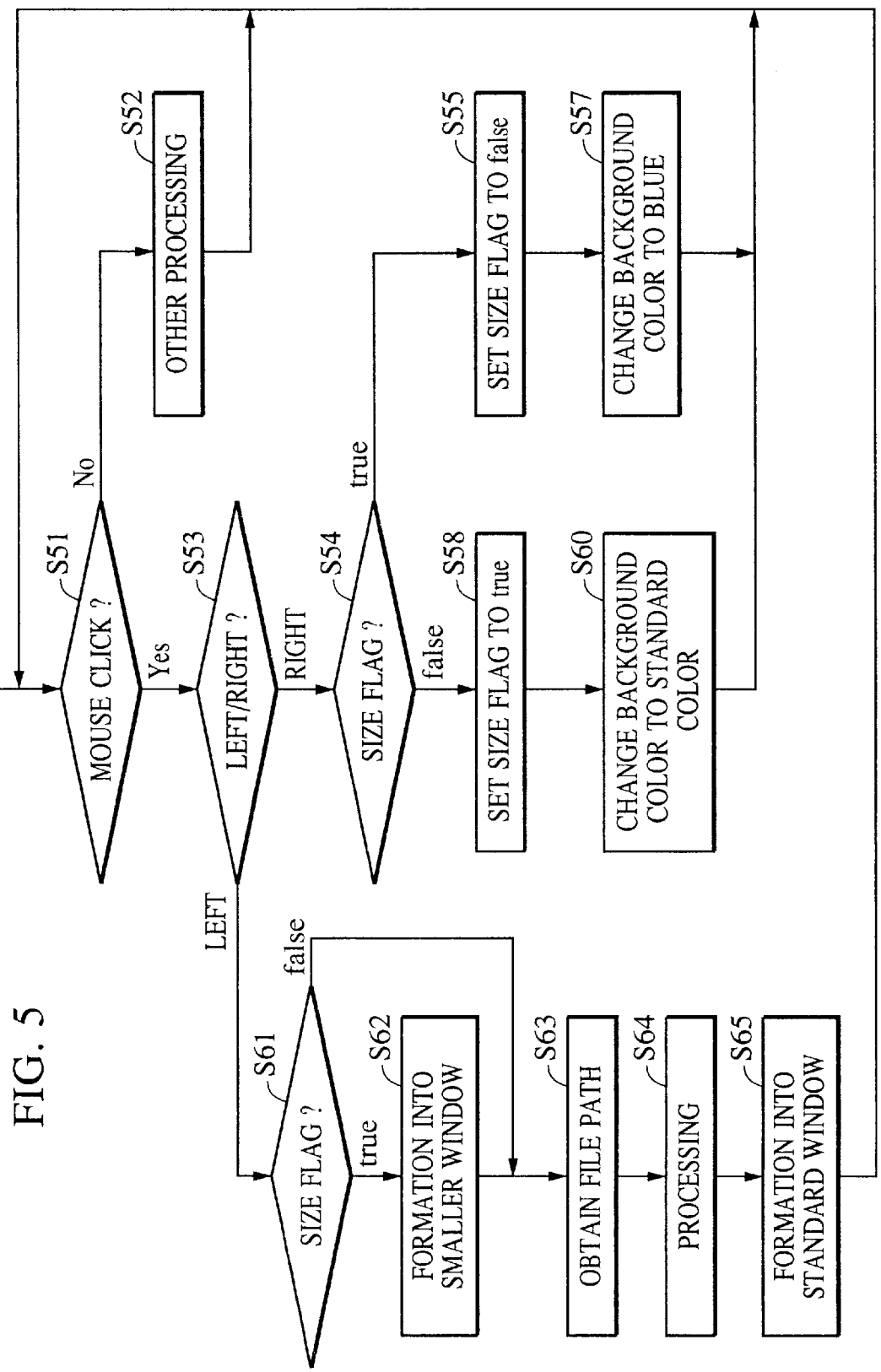
FIG. 5 is a flowchart showing a processing operation of this embodiment of the present invention.

Next, the processing procedure in this embodiment is described by referring to the flowchart of FIG. 5.

Initially, in step S51, it is determined whether or not the mouse has been clicked. When the mouse has not been clicked, other processing is performed in step S52.

When the mouse has been clicked, it is determined in step S53 whether the click is a right click or a left click. In the case of the right click, it is determined in step S54 whether a logic variable (hereinafter referred to as a size flag) of a smaller window size mode is true or false.

When the logic variable is true, the size flag is set to false in step S55, and in step S57, the background color of the application form 18 is changed from a standard color to blue.

When the logic variable is false, the size flag is set to true in step S58, and in step S60, the background color is returned from blue to the standard color.

In the case where it is determined in step S53 that the click is the left click, if the size flag is true, the window size is reduced, as shown in FIG. 4. When the size flag is false, the size of the window is not changed. At this point, when the window is reduced to a small size, since the size of the window is required to be returned to the original size before the reduction, the window size is reduced after the current size is stored as a variable.

Next, in step S63, a file path of a display image is obtained. Then, in step S64, processing, such as copying or moving, is performed.

In step S65, when the window size has been reduced, the variable by which the original size has been stored is called, and the window size is returned to its original size.

Although in this embodiment processing is performed so that the window is reduced to a small size, the window may be temporarily erased from the screen, and only the frame of the window of the copying source may be displayed.

As described above, according to this embodiment, since the window size of the transfer source is reduced or the window is erased as a result of dragging detection, the window of the transfer destination is more easily viewed, and there is no need to set the two windows at positions where parts of both the windows can be simultaneously seen.

Further, even when this copying operation is repeated a plurality of times, since the window size of the transfer-source folder is returned to its original size as a result of detecting the completion of dropping, there is no need to adjust the size and position of the transfer-source folder or the transfer-destination folder, and thus ease of operation is improved.

Furthermore, since a selection can be made such that file copy is performed without changing the window size in the same manner as in the conventional method, and since consideration is given for a situation where a person who operates the system for the first time is not at a loss because the window has been erased by dragging, operations can be performed with assurance.

As has been described up to this point, according to the present invention, when an operation, such as copying or moving of a file, is performed, since processing is performed on a window having a file of a transfer source, ease of operation is improved.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus, comprising:
   window display means for displaying a plurality of windows on a display screen;
   data display means for displaying data in each of the plurality of windows;
   first designation means for designating data displayed in a first window from among the plurality of windows;
   reduction means for reducing the first window when data is designated by said first designation means;
   second designation means for designating a position in a second window in a state of designating the data by said first designation means;
   transmission means for transmitting the data from the fist window to the position in the second window on a basis of said second designation means;
   resize means for returning said reduced first window to its original size after the second window is designated by said second designation means; and
   flag means for recording a flag which indicates whether or not to reduce a window, and wherein said reduction means deletes the window in a case that the flag is recorded in a recording means,
   wherein a color of said display means is different depending on the case that the flag is recorded in said recording means and a case that the flag is not recorded in said recording means.

2. An information processing apparatus according to claim 1, further comprising:
   flag means for recording a flag which indicates whether or not to delete a window, and wherein an erasing means deletes the window in the case that the flag is recorded in said recording means.

3. An information processing apparatus according to claim 2, wherein the background color of said display means is different depending on the case that the flag is recorded in said recording means and the case that the flag is not recorded in said recording means.

4. The information processing apparatus of claim 1, wherein the color of said display means is a background color.

5. The information processing apparatus of claim 1, wherein the flag is set and reset each time a mouse button is pressed.

6. An information processing apparatus, comprising:
   window display means for displaying a plurality of windows on a display screen;
   data display means for displaying data in each of the plurality of windows;
   designation means for designating data displayed in a first window from among the plurality of windows;
   processing means for performing processing on the first window when data is designated by said designation means;
   processing release means for displaying the first window at an original state when a position in a second window is designated from among the plurality of windows,
   wherein the processing by said processing means only displays a frame of the first window; and
   flag means for recording a flag which indicates whether or not to display only the frame of a window, and wherein said window display means displays the frame of the window in the case that the flag is recorded in a recording means,
   wherein a color of said display means is different depending on the case that the flag is recorded in said recording means and the case that the flag is not recorded in said recording means.

7. The information processing apparatus of claim 6, wherein the color of said display means is a background color.

8. The information processing apparatus of claim 6, wherein the flag is set and reset each time a mouse button is pressed.

9. A computer-readable memory storing a computer-readable program for causing a computer to process a plurality of windows for displaying on a display screen, the program comprising the steps of:
   displaying the plurality of windows on the display screen;
   designating a file displayed in one window from among the plurality of windows;
   reducing a size of the one window in which a designated file is displayed; and
   flag means for recording a flag which indicates whether or not to reduce a window, and wherein said reducing step reduces the window in a case that the flag is recorded in a recording step,
   wherein a color of said display screen is different depending on the case that the flag is recorded in said recording step and a case that the flag is not recorded in said recording step.

10. The memory of claim 9, wherein the color of said display screen is a background color.

11. The memory of claim 9, wherein the flag is set and reset each time a mouse button is pressed.

12. An information processing method, comprising:
   a window display step of displaying on a display means a plurality of windows on a display screen;
   a data display step of displaying data in each of the plurality of windows;
   a first designation step of designating data displayed in a first window from among the plurality of windows;
   a reduction step of reducing the first window when data is designated by said first designation step;
   a second designation step of designating a position in a second window in the state of designating the data by said first designation step;
   a transmission step of transmitting the data from the first window to the position in the second window on a basis of said second designation step;
   a resize step of returning said reduced first window to its original size after the second window is designated by said second designation step; and
   a flag step of recording a flag which indicates whether or not to reduce a window, and wherein said reduction step reduces the windows in a case that the flag is recorded in a recording step, wherein a color of said display means is different depending on the case that the flag is recorded is said recording step and the case that the flag is not recorded in said recording step.

13. An information processing method according to claim 24, further comprising:

a flag step of recording a flag which indicates whether or not to delete a window, and wherein an erasing step deletes the window in the case that the flag is recorded in said recording step.

14. An information processing method according to claim 13, wherein a background color of said display means is different depending on the case that the flag is recorded in said recording step and the case that the flag is not recorded in said recording step.

15. The information processing method of claim 12, wherein the color of said display means is a background color.

16. The information processing method of claim 12, wherein the flag is set and reset each time a mouse button is pressed.

17. An information processing method, comprising:

a window display step of displaying a plurality of windows on a display screen;

a data display step of displaying data in each of the plurality of windows;

a designation step of designating data displayed in a first window from among the plurality of windows;

a processing stop of performing processing on the first window when data is designated by said designation step; and a processing release step of displaying the first window at an original state when a position in a second window is designated from among the plurality of windows, wherein the processing by said processing step only displays a frame of the first window, a flag step of recording a flag which indicates whether or not to display only a frame of a window, and wherein said window display step displays the frame of the window in the case that the flag is recorded in a recording step, wherein a color of said display screen is different depending on the case that the flag is recorded in said recording step and a case that the flag is not recorded in said recording step.

18. The information processing method of claim 17, wherein the color of said display screen is a background color.

19. The information processing method of claim 17, wherein the flag is set and reset each time a mouse button is pressed.

20. A storage medium storing a computer readable program for controlling an information processing method, comprising:

a window display step of displaying on a display means a plurality of windows on a display screen;

a data display step of displaying data in each of the plurality of windows;

a first designation step of designating data displayed in a first window from among, the plurality of windows;

a reduction step of reducing the first window when data is designated by said first designation step;

a second designation step of designating a position in a second window in the state of designating the data by said first designation step;

a transmission step of transmitting the data from the first window to the position in the second window on a basis of said second designation step;

a resize step of returning said reduced first window to its original size after the second window is designated by said second designation step; and a flag step of recording a flag which indicates whether or not to reduce a window, and wherein said reduction step reduces the window in the case that the flag is recorded in a recording step, wherein a color of said display means is different depending on a case that the flag is recorded in said recording step and a case that the flag is not recorded in said recording step.

21. An information processing method according to claim 20, further comprising:

a flag step of recording a flag which indicates whether or not to delete a window, and wherein an erasing step deletes the window in the case that the flag is recorded in said recording step.

22. A storage medium according to claim 21, wherein a background color of said display means is different depending on a case that the flag is recorded in said recording step and a case that the flag is not recorded in said recording step.

23. The storage medium of claim 20, wherein the color of said display means is a background color.

24. The storage medium of claim 20, wherein the flag is set and reset each time a mouse buttom is pressed.

25. A storage medium storing a computer readable program for controlling an information processing method, comprising:

a window display step of displaying a plurality of windows on a display screen;

a data display step of displaying data in each of the plurality of windows;

a designation step of designating data displayed in a first window from among the plurality of windows;

a processing step of performing processing on the first window when data is designated by said designation step; and a processing release step of displaying the first window at an original state when a position in a second window is designated from among the plurality of windows, wherein the processing by said processing step only displays a frame of the first window; and a flag step of recording a flag which indicates whether or not to display only a frame of a window, and wherein said display screen displays the frame of the window in the case that the flag is recorded in a recording step, wherein a color of said display screen is different depending on the case that the flag is recorded in said recording step and the case that the flag is not recorded in said recording step.

26. A storage medium according to claim 25, further comprising:

a flag means for recording a flag which indicates whether or not to display only a frame of a window, and wherein said window display means displays the frame of the window in a case that the flag is recorded in said recording step.

27. A storage medium according to claim 26, wherein a background color of said display means is different depending on a case that the flag is recorded in said recording step and a case that the flag is not recorded in said recording step.

28. The storage medium of claim 25, wherein the color of said display screen is a background color.

29. The storage medium of claim 25, wherein the flag is set and reset each time a mouse button is pressed.

* * * * *

UNITED STATES PATENT AND TRADEMARK OFFICE
CERTIFICATE OF CORRECTION

PATENT NO. : 6,344,864 B1 Page 1 of 1
DATED : February 5, 2002
INVENTOR(S) : Yoshihiko Watanabe It is certified that error appears in the above-identified patent and that said Letters Patent is hereby corrected as shown below:

Column 3,
Line 16, "than" should read -- than a --.

Column 4,
Line 12, "copy" should read -- copied --.

Column 5,
Line 32, "fist" should read -- first --.

Column 7,
Line 4, "is" (second occurrence) should read -- in --;
Line 8, "24," should read -- 12, --;
Line 29, "stop" should read -- step --; and
Line 59, "among," should read -- among --.

Signed and Sealed this

Twenty-second Day of October, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO.     : 6,344,864 B1                                              Page 1 of 1
DATED          : February 5, 2002
INVENTOR(S)    : Yoshihiko Watanabe It is certified that error appears in the above-identified patent and that said Letters Patent is hereby corrected as shown below:

<u>Column 8,</u>
Line 12, "An information processing method" should read -- A storage medium --.

Signed and Sealed this

Second Day of September, 2003

JAMES E. ROGAN
*Director of the United States Patent and Trademark Office*